Figure 6:
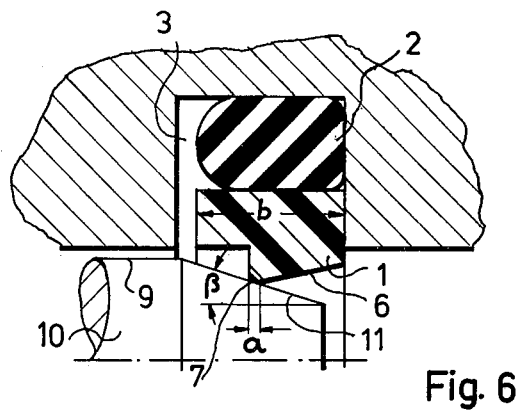

United States Patent [19]

Müller

[11] 4,449,718
[45] May 22, 1984

[54] PACKING FOR HYDRAULIC PISTONS OR PISTON RODS

[75] Inventor: Heinz K. Müller, Waiblingen, Fed. Rep. of Germany

[73] Assignee: Busak & Luyken, Fed. Rep. of Germany

[21] Appl. No.: 511,109

[22] Filed: Jul. 6, 1983

[30] Foreign Application Priority Data

Jul. 10, 1982 [DE] Fed. Rep. of Germany ....... 3225906

[51] Int. Cl.³ ............................................ F16J 15/32
[52] U.S. Cl. .................................... 277/170; 277/142; 277/165; 277/152
[58] Field of Search ................................ 277/152-153, 277/165, 168-172, 142-145

[56] References Cited

U.S. PATENT DOCUMENTS

| | | | |
|---|---|---|---|
| 2,868,574 | 1/1959 | Rich | 277/152 X |
| 3,011,803 | 12/1961 | Buckner et al. | 277/165 X |
| 3,315,972 | 4/1967 | Ahbeck | |
| 3,942,806 | 3/1976 | Edlund | |
| 4,198,063 | 4/1980 | Shimizu et al. | 277/170 X |
| 4,230,324 | 10/1980 | Derman | 277/168 X |
| 4,234,196 | 11/1980 | Sida | 277/165 X |

FOREIGN PATENT DOCUMENTS 2457762 6/1976 Fed. Rep. of Germany ...... 277/165
2705081 8/1978 Fed. Rep. of Germany ...... 277/142
461203 8/1968 Switzerland .

*Primary Examiner*—Robert S. Ward
*Attorney, Agent, or Firm*—Leydig, Voit, Osann, Mayer & Holt, Ltd.

[57] ABSTRACT

In packings for hydraulic pistons or piston rods with a packing ring comprised of a tough elastic synthetic material as the contact packing between a stationary machine part comprising an annular groove and a moving machine part comprising an initial slope and of a rubber clamping ring clamping the packing ring radially and providing a sealing action with respect to the annular groove in the stationary machine part, an annular surface is located between the end face of a step at the high pressure side and a conical surface adjoining the latter on the low pressure side, which annular surface forms an obtuse angle with the conical surface of such a value that when the packing travels in over the initial slope the resultant $F_{res}$ of the normal force $F_N$ and of the frictional force $F_R$ halves the sealing edge angle. When using conventional materials and conventional angles for the conical surface and the inlet slope, a value of 45° is provided for the angle between the annular surface and the packing axis. The axial length of the annular surface preferably amounts to 5% of the axial length of the packing ring.

3 Claims, 8 Drawing Figures

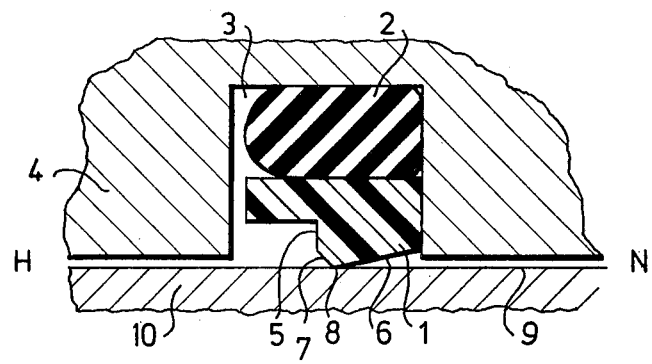
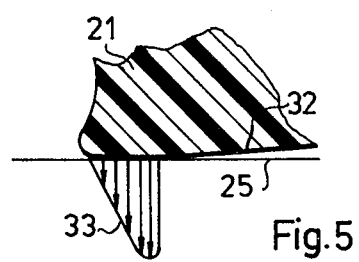
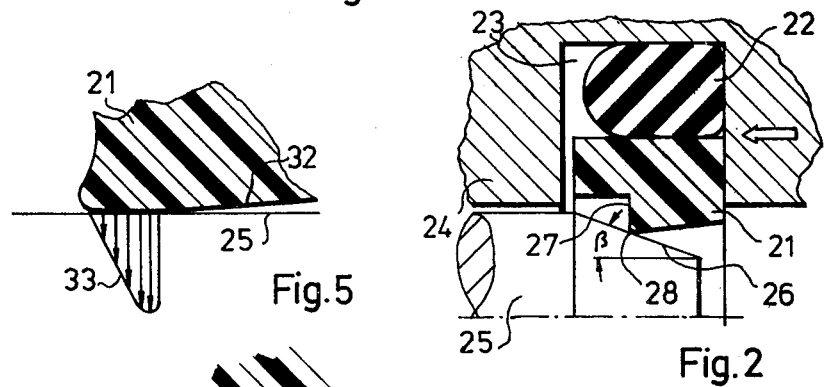
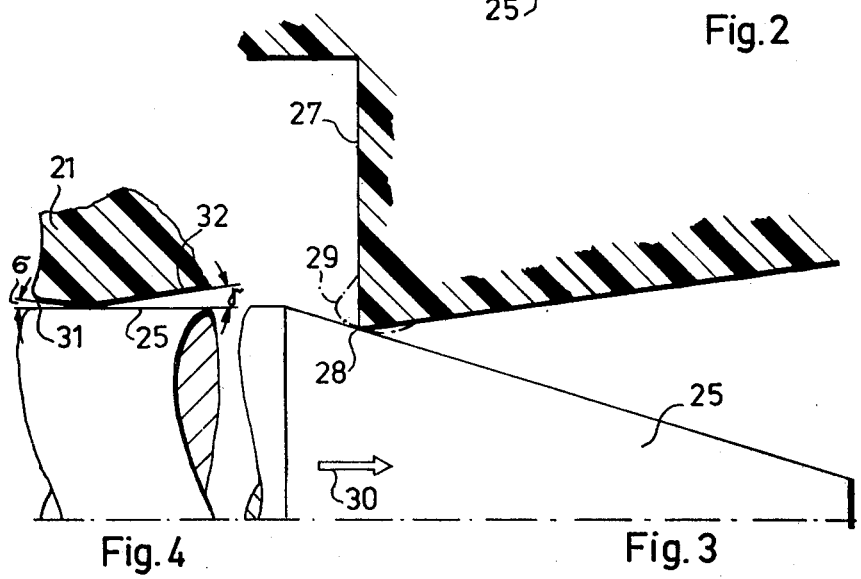

PACKING FOR HYDRAULIC PISTONS OR PISTON RODS

The invention relates to a packing for hydraulic pistons or piston rods with a packing ring comprised of tough elastic synthetic material as a contact packing between a stationary machine part comprising an annular groove and a moving machine part comprising an initial slope and of a rubber clamping ring clamping the packing ring radially and which has a sealing effect with respect to the annular groove in the stationary machine part, in which case the peripheral surface of the packing ring adjacent the moving machine part—seen in the axial direction—comprises a step in the region of its centre, the end face of which step is adjacent the high pressure side and starting from the step towards the low pressure side forms a conical surface opening at a small wedge angle, so that a sealing edge is located between the end face of the step and the conical surface.

A packing of this type is known from German AS No. 23 25 000. It is characterised by an extremely low leakage rate and a very long working life. However, with the very wide use which these packings have experienced, some failures could always be observed, that is to say some examples of packings of this type which exhibited an increased leakage rate as well as a reduced working life.

It is the object of the invention to improve the packing of the aforementioned type so that failures of this type no longer occur.

This object is achieved according to the invention due to the fact that located between the conical surface forming the wedge angle and the step is an annular surface which with the conical surface forms an acute angle $\mathcal{H}$ of such magnitude that when the packing travels over the initial slope located on the moving machine part, the resultant $F_{res}$ of the contact normal force $F_N$ and of the frictional force $F_R$ at least approximately halves the sealing edge angle $\mathcal{H}$.

A thorough investigation of the known packing has revealed that the aforementioned failures cannot be attributed to defects in the material, manufacturing errors or to an inadequate surface quality of the machine parts to be sealed, but to deformations on the sealing edge, which when installing the packing occur above all when the packing ring with the end face of the step is pushed in front on the initial slope of the moving machine part. The contact forces exerted exclusively at this time on the sealing edge and transmitted from there into the packing ring result in material displacements in the region of the sealing edge, which result inter alia in bulging of the end face of the step, although one would firstly assume that the frictional forces in the said pushing direction must cause a displacement of the material towards the wedge surface. Bulging at the end face in turn leads to the formation of a wedge gap at the high pressure side, through which a greater quantity of the medium to be sealed off is drawn out of the high pressure region than can be drawn back into the high pressure region through the wedge gap provided intentionally and located on the low pressure side. This gives rise to increased and disturbing leakage rates. On the other hand, due to the provision of the annular surface, an obtuse-angled construction of the sealing edge and such a distribution of the forces introduced at this point is achieved that harmful material displacements are reliably avoided when locating the packing ring and the packings constructed according to the invention without exception have the desired high sealing action and long service life. Surprisingly it has been found that the sealing action and service life are improved with respect to the known packings with an acute-angled sealing edge even if the packing ring with the conical surface is pushed in front on the initial slope, so that in many applications, a perfect seal is achieved.

The provision of an annular surface opening towards the high pressure side on the sealing edge seems to contradict the principle of the packing according to the generic notion, because for this packing, on the one hand the step adjacent the high pressure side and on the other hand the wedge gap on the low pressure side between the packing and the moving machine part are characteristic. The wedge gap causes the hydraulic medium passing through the packing to be drawn back to the high pressure side. The result of a wedge gap on the high pressure side is accordingly to draw out the medium to be sealed off from the high pressure side to the low pressure side and accordingly a high leakage rate. Therefore, the existance of a wedge gap on the high pressure side must be avoided at all costs. However, as aforedescribed, it has been shown that a wedge gap on the high pressure side can result exactly from material displacements on the acute-angled sealing edge, which leads to increased leakage rates, whereas when providing an annular surface, which forms a relatively large angle with the direction of the packing axis, a drawing action of this type is no longer present, so that an annular surface of this type is harmless. With the normal values of the coefficient of friction between the packing ring and the surface of the moving machine part, of the wedge angle $\gamma$ on the packing ring and of the angle $\beta$ of the initial slope, a value of approximately 45° results for the angle $\alpha$ of the annular surface in relation to the packing axis.

The axial length of the annular surface may amount to approximately 5% of the axial length of the packing ring. In practice, suitable axial lengths of the annular surfaces for normal packings are 0.1 to 0.8 mm, depending on the size of the packing. In any case, these axial lengths are so slight that the basic effect of the packings according to the generic notion is maintained, which can be attributed to the fact that the sealing edge is located directly on a step adjacent the high pressure side and adjoining the sealing edge is a conical surface which forms a narrow wedge gap with the opposed surface.

Figures 7, 8:
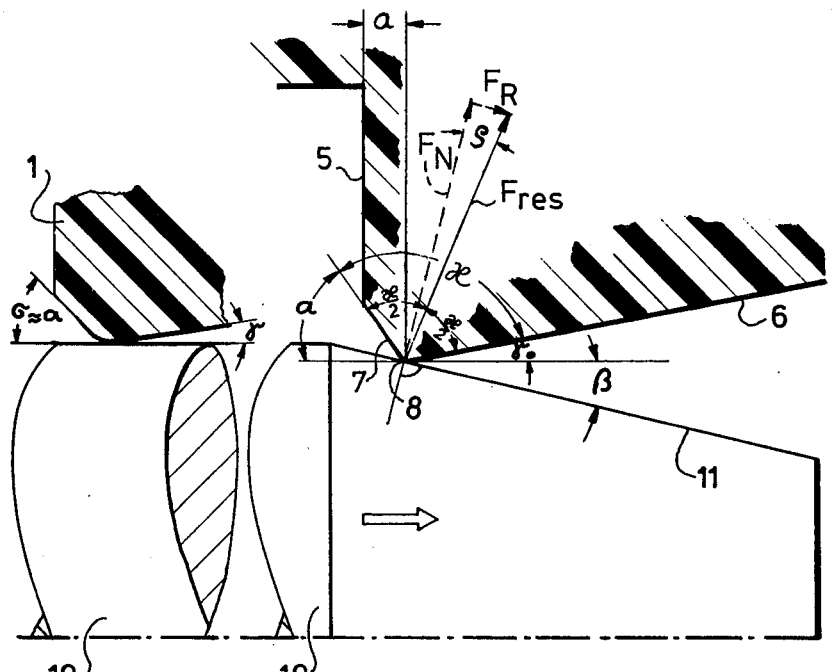

The invention is described in detail hereafter with reference to one embodiment illustrated in the drawings, in which:

FIG. 1 is a cross-section through a packing according to the invention,

FIG. 2 is a diagrammatic illustration, which shows the sliding of the packing on the initial slope of the stationary machine part, FIG. 3 shows a detail of FIG. 2 including the sealing edge, to a greatly enlarged scale, FIG. 4 is an illustration similar to FIG. 3 with the packing ring pushed up completely on the stationary machine part, FIG. 5 shows a variation of the arrangement according to FIG. 4, FIG. 6 is an illustration similar to FIG. 2, which shows the pushing-up of the packing according to the invention on the initial slope of the stationary machine part, FIG. 7 shows a detail of FIG. 6 including the sealing edge, to a greatly enlarged scale and FIG. 8 is an illustration similar to FIG. 7 with the packing pushed completely up on the stationary machine part.

The packing illustrated in FIG. 1 consists of a packing ring 1 and of a clamping ring 2 arranged coaxially with respect to the packing ring 1. The packing ring 1 consists of a tough resilient synthetic material based on polytetrafluorethylene, whereas the clamping ring 2 consists of a rubber material. The two rings are inserted in a groove 3 in a machine part 4, which is referred to as the stationary machine part, because the packing carries out no movements with respect to this machine part. The rubber clamping ring 2 exerts a radially directed clamping force on the packing ring 1 and at the same time seals it off in the groove 3 of the stationary machine part 4. On its peripheral surface remote from the clamping ring 2, the packing ring 1 comprises a step 5, which, seen in the axial direction of the packing, lies in the region of the centre of the packing ring. The end face formed by the step 5 is adjacent the high pressure side H of the packing. Adjoining the step on the low pressure side N is a conical surface 6, which opens to the low pressure side N with a small wedge angle. Located at the transition point from the end face of the step 5 to the conical surface 6 is an annular surface 7, which is in the form of a conical surface opening towards the high pressure side H, so that a sealing edge 8 is produced, by which the packing ring 1 bears against the opposite surface 9 of the moving machine part 10, which is offset slightly towards the low pressure side N with respect to the end face of the step 5. Nevertheless, the sealing edge 8 is still located in the region of the axial centre of the packing and at a point where the contact pressure of the clamping ring 2 is at a maximum.

The annular surface 7 adjacent the high pressure side ensures that when placing the packing ring which is under pre-tension on the moving machine part 10, the forces necessary for expanding the packing ring are introduced in such a way that harmful deformation of the packing ring cannot occur. In order to provide a better understanding of the processes occurring when the packing ring is pushed up on the moving machine part, this operation is first of all described with reference to FIGS. 2 to 5 for a packing according to the generic notion, which the annular surface provided according to the invention does not yet have. FIG. 2 shows diagrammatically a packing consisting of the packing ring 21 and clamping ring 22, which is located in the groove 23 in the stationary machine part 24. This packing is to be pushed up on the moving machine part 25, which comprises an initial slope 26 at its end. As shown in FIG. 2, the diameter of the packing ring 21 before installation is less than the diameter of the moving machine part 25, so that when it is pushed up over the initial slope, the packing ring must be expanded. Since the packing ring 21 consists of a tough elastic material, a partly plastic and partly elastic deformation of the packing ring 21 thus takes place. If, as shown in FIG. 2, the packing ring with the step 27 located at the front is pushed up on the moving machine part 25, the packing ring comes to bear exclusively by the sealing edge 28 on the initial slope 26, so that all the forces necessary for the expansion of the packing ring 21 are transmitted to the packing ring at the sealing edge 28. These forces result in a deformation of the packing ring, as indicated by the dot dash line 29 in FIG. 3. First of all it appears surprising that the displacement of material is manifested substantially in bulging on the step 27, although one would actually assume that the pushing of the moving machine part 25 into the packing ring 21 would result in an entrainment of the material in the pushing direction 30. However, in fact, the stress relationships in the material of the packing ring in the region of the sealing edge 28 are such that essentially the illustrated bulging on the step 27 takes place.

As illustrated in FIGS. 4 and 5, the bulge on the end face 27 of the packing ring 21 has the result that when the packing ring 21 has reached the cylindrical opposing surface on the moving machine part 25, the maximum surface pressure is no longer located at the shoulder, but is offset with respect to the shoulder in the direction of the low pressure side. This may thus lead to the formation of a very flat wedge gap 31, as shown in FIG. 4, whereof the wedge angle $\sigma$ is smaller than the wedge angle $\gamma$ between the conical surface 32 of the packing on the low pressure side and the opposing surface on the moving machine part. This wedge gap with the small angle $\sigma$ causes drawing-out of the medium to be sealed off in greater quantities than can be drawn back from the low pressure side into the high pressure side. A considerable leakage thus occurs. The same effect also occurs when, as shown in FIG. 5, there is no clear wedge gap at the high pressure side, but the surface pressure between the packing ring 21 and moving machine part 25 at the edge of the packing on the high pressure side is 0 and as a result of the material displacement which has taken place, increases from this value to a maximum value close to the position where the conical surface 32 of the packing ring 21 on the low pressure side begins. The pressure distribution at the packing is shown by the arrows 33 in FIG. 5.

Now if the packing according to the invention comprises an annular surface 7 between the conical surface 6 and the step 5, then the relationships illustrated in FIGS. 6 to 8 occur. Like FIG. 2, FIG. 6 also shows how the packing located in a groove 3 in the stationary machine part is pushed up on the initial slope 11 of the moving machine part 10. In this case, the packing ring 1 again comes to bear by the sealing edge 8 on the initial slope 11. In this case also, the introduction of all the forces necessary for expanding the packing ring 1 takes place at the sealing edge 8. However, this sealing edge is now located between the conical surface on the low pressure side and the annular surface 7 and the sealing edge 8 forms the vertex of an obtuse angle $\mathcal{H}$ which is enclosed by the conical surface and the annular surface 7. In this case, this angle $\mathcal{H}$ is chosen so that when the packing travels over the initial slope 11 located on the moving machine part 10, the resultant $F_{res}$ of the contact normal force of the $F_N$ and of the friction force $F_R$ halves the sealing edge angle $\mathcal{H}$.

If $\beta$ signifies the angle of the initial slope, $\gamma o$ signifies the wedge angle formed by the conical surface 6 in the manufacturing state, $\alpha$ signifies the angle of the annular surface 7 and $\varrho$ the angle corresponding to the frictional force $F_R$, then the following equations can be read from FIG. 7:

$$\rho + \mathcal{H}/2 + \gamma o + \beta = 90° \text{ or}$$

$$\alpha + \mathcal{H}/2 - \beta - \rho = 90°$$

The following result is obtained from these quantities for the optimum angle $\alpha$ of the annular surface 7

$$\alpha = 2(\beta + \rho) + \gamma_0$$

In the packings according to the invention, a wedge angle $\gamma$ of 7° is appropriately used, as is also normal in the packings according to the generic notion. Likewise, a particularly suitable material for packings of this type is polytetrafluoroethylene, which on average has a coefficient of friction of $\mu = 0.07$ with respect to steel as the opposing surface. This produces an angle of friction $\rho = 4°$. A value of 15° has generally proved satisfactory as the angle $\beta$ for the initial slope. Under these conditions, an optimum value for the angle $\alpha$ of the annular surface 7 is $\alpha = 2(15° + 4°) + 7° = 45°$. It will be understood that for other relationships, the angle $\alpha$ assumes other values and must be determined according to the above equations.

It has been shown that in the case of packing rings, which have an annular surface 7 located below the optimum angle $\alpha$, no harmful, one-sided and plastic displacement of material occurs at the time of installation. Therefore, as shown in FIG. 8, after installation, a wedge gap $\sigma$ on the high pressure side is produced, but which is approximately equal to the angle $\alpha$ and consequently very much greater than the wedge angle $\gamma$ on the low pressure side produced in the assembled condition. It is thus once more ensured that the return capacity of the wedge gap with the small angle $\gamma$ outweighs the lubricating film formation when the moving machine part moves out and therefore the seal is ensured in the case of the reciprocating movement of this machine part.

The axial length a of the annular surface 7 is relatively small. It amounts to only a few percent, in the embodiment illustrated 5% of the axial length b of the packing ring 1. With the customary dimensions of such packing rings, the axial length a of the annular surface 7 lies in the range between 0.1 and 0.8 mm. This short length is sufficient to achieve the above-mentioned advantageous properties of the packing according to the invention, without the basic properties of the packing according to the generic notion changing due to the axial displacement of the sealing edge 8 with respect to the step 50, which leads to the known, good packing properties.

It should also be noted that when the packing is installed in such a way that the step 5 is opposed to the moving-in direction, the initial slope first of all comes into engagement with the conical surface 6 and therefore the ring is expanded virtually completely before the sealing edge 8 comes into engagement with the cylindrical opposing surface of the moving machine part, at the end of the initial slope. The transmission of forces to the sealing edge is then relatively low, so that even with the conventional packings, no deformations normally occur, which lead to an increased leakage. However, with this method of installation, the provision of the annular surface according to the invention is an advantage because it still leads to a further improvement of the sealing properties, with the result that absolute freedom from leakage is achieved over very long periods of time.

What is claimed is:

1. Packing for hydraulic pistons and piston rods with a packing ring comprised of a tough elastic synthetic material as a contact packing between a stationary machine part comprising an annular groove and a moving machine part comprising an initial slope and of a rubber clamping ring clamping the packing ring radially and providing a sealing action with respect to the annular groove in the stationary machine part, in which the peripheral surface of the packing ring adjacent the moving machine part as seen in the axial direction comprises a step in the region of its centre, the end face of which step is adjacent the high pressure side and starting from the step towards the low pressure side forms a conical surface opening with a small wedge angle, so that a sealing edge is located between the end face of the step and the conical surface, wherein located between the conical surface forming the wedge angle and the step is an annular surface which with the conical surface forms an obtuse angle of such a value that when the packing travels in over the initial slope located on the moving machine part, the resultant $F_{res}$ of the contact normal force $F_N$ and the frictional force $F_R$ at least approximately halves the sealing edge angle.

2. Packing according to claim 1, wherein the annular surface forms an angle of approximately 45° with the packing axis.

3. Packing according to claim 1 wherein the axial length of the annular surface amounts to approximately 5% of the axial length of the packing ring.

* * * * *

UNITED STATES PATENT AND TRADEMARK OFFICE
CERTIFICATE OF CORRECTION

PATENT NO. : 4,449,718

DATED : May 22, 1984

INVENTOR(S) : Heinz K. Muller

It is certified that error appears in the above-identified patent and that said Letters Patent is hereby corrected as shown below:

On the title page column 1, line 5, change "Busak & Luyken" to --Busak & Luyken GmbH & Co.--.

Signed and Sealed this

Eighteenth Day of February 1986

[SEAL]

Attest:

Attesting Officer

DONALD J. QUIGG

Commissioner of Patents and Trademarks